P. A. ANGESKI.
SPRING WHEEL.
APPLICATION FILED MAR. 19, 1915.
1,163,195.
Patented Dec. 7, 1915.
2 SHEETS—SHEET 1.
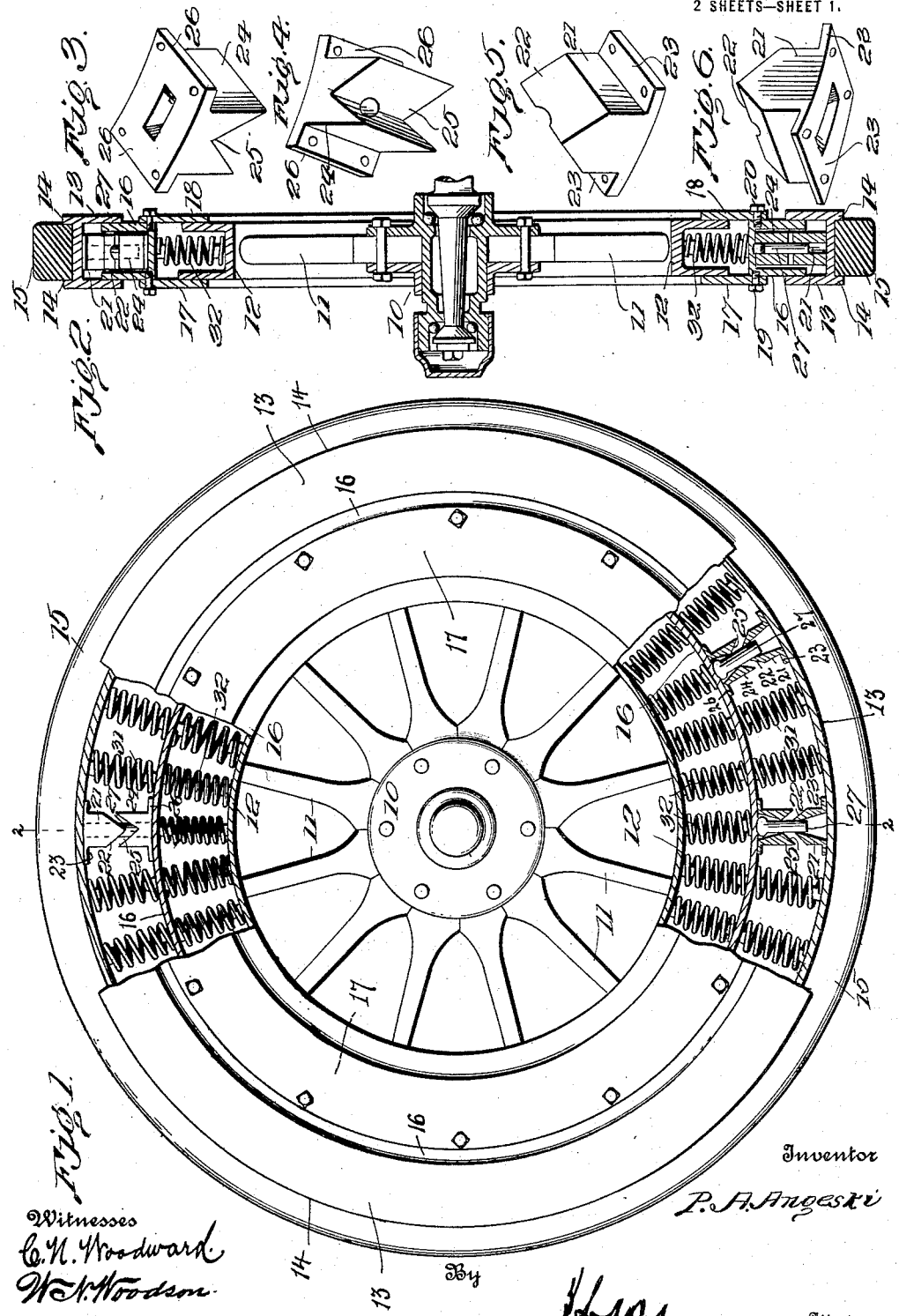

P. A. ANGESKI.
SPRING WHEEL.
APPLICATION FILED MAR. 19, 1915.
1,163,195.
Patented Dec. 7, 1915.
2 SHEETS—SHEET 2.
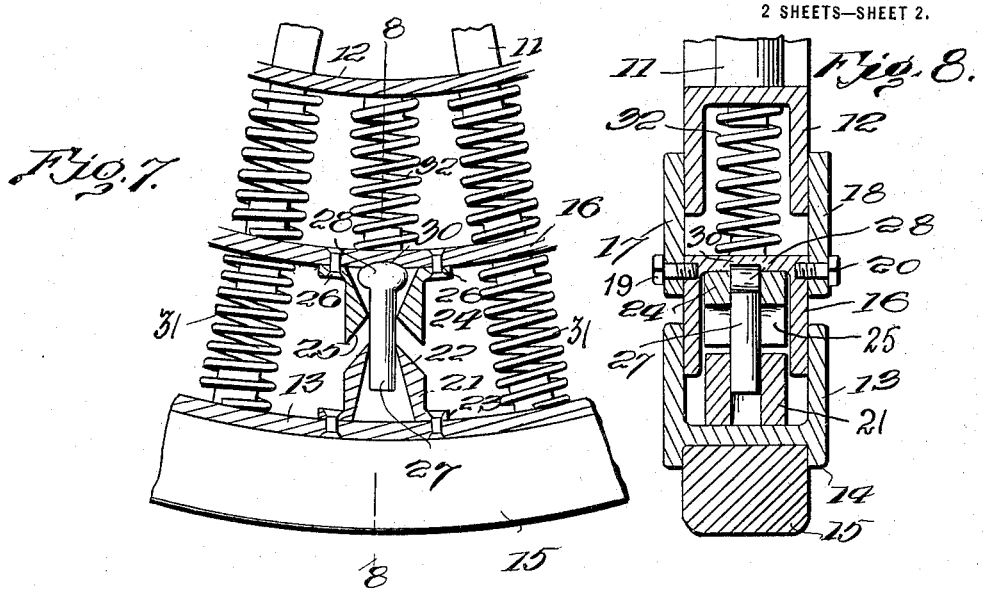
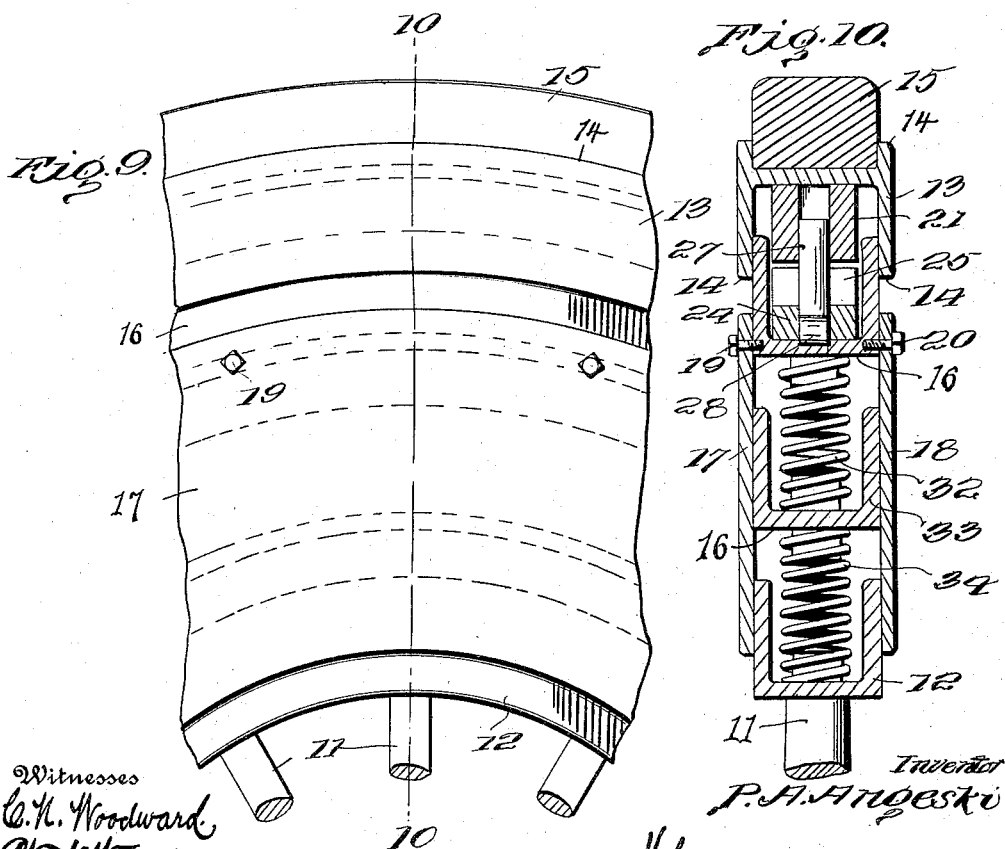
Witnesses
C. H. Woodward
W. N. Woodson
Inventor
P. A. Angeski
By ........., Attorneys

UNITED STATES PATENT OFFICE.

PETER A. ANGESKI, OF LILLY, PENNSYLVANIA.

SPRING-WHEEL.

1,163,195.  Specification of Letters Patent.  Patented Dec. 7, 1915.

Application filed March 19, 1915. Serial No. 15,601.

*To all whom it may concern:*

Be it known that I, PETER A. ANGESKI, a citizen of the United States, residing at Lilly, in the county of Cambria and State of Pennsylvania, have invented certain new and useful Improvements in Spring-Wheels, of which the following is a specification.

This invention relates to improvements in spring wheels, and has as one of its objects to improve the efficiency and utility of devices of this character.

Another object of the invention is to provide a simply constructed device having a plurality of circumferentially arranged springs increasing in strength toward the periphery of the wheel, and likewise provided with means for preventing dismembering of the parts under severe strains to which devices of this character are liable when in use.

With these and other objects in view, the invention consists in certain novel features as hereinafter shown and described and then more particularly pointed out in the claims; and in the drawings illustrative of the preferred embodiment of the invention.

Figure 1 is a side elevation partly in section of one of the improved wheels. Fig. 2 is a section on the line 2—2 of Fig. 1. Fig. 3 is an enlarged perspective view from above of one of the inner interlocking blocks. Fig. 4 is an enlarged perspective view from beneath of one of the inner interlocking blocks. Fig. 5 is an enlarged perspective view from above of one of the outer interlocking blocks. Fig. 6 is an enlarged perspective view from beneath of one of the outer interlocking blocks. Fig. 7 is an enlarged sectional detail illustrating the interior construction. Fig. 8 is a section on the line 8—8 of Fig. 7. Fig. 9 is a side view of a portion of a wheel illustrating a modification in the construction. Fig. 10 is a section on the line 10—10 of Fig. 9.

Corresponding and like parts are referred to in the following description and indicated in all the views of the accompanying drawings by the same reference characters.

The improved device is designed more particularly for use upon automobiles, auto trucks, and similar vehicles, but may likewise be employed wherever a resilient or yieldable wheel is required.

The improved device may also be employed upon the wheels of aeroplanes and the wheels of motorcycles and the like, and it is not desired to limit the invention in any manner in this respect.

The improved device includes a hub, indicated conventionally at 10, of any of the usual anti-friction forms, and with spokes 11 radiating from the hub and connected to a channeled inner rim 12, the rim 12 being less in diameter than the wheel when completed. Spaced from the rim 12 is an outer channeled rim 13. The channel of the inner rim 12 is directed outwardly while the channel of the outer rim 13 is directed inwardly. The rim member 13 is provided with outwardly directed flanges 14 which support a time member 15, preferably of rubber or like material. Located between the inner rim 12 and the outer rim 13 is an intermediate channeled rim 16, the outer edges of the rim 16 operating between the sides of the rim 13, as represented in Fig. 2. Annular cover plates 17—18 are connected to the rim 16 in any suitable manner, as for instance, by bolts or screws 19—20, as shown in Fig. 2. The members 17—18 thus cover the space between the rims 12—16 and likewise effectually prevent lateral displacement between the rims.

Connected to the inner face of the outer rim 13 are a plurality of block devices comprising a body 21 with the inner side V-shaped as represented at 22 and each provided with flanges 23 whereby they may be riveted or otherwise secured to the rim 13. Similar blocks are connected to the inner face of the intermediate rim 16, each of the inner blocks comprising a body portion 24 having a V-shaped notch 25 in its outer face to receive the V-shaped portions 22 of the blocks 21. Each of the blocks 24 is provided with lateral flanges 26 to receive the supporting rivets or other fastening devices whereby the inner blocks are secured in place. For the purpose of this description, the blocks 21 will be referred to as the outer blocks, and the blocks 24 as the inner blocks. Each of the inner blocks 24 is provided with a socket to receive a holding pin 27 having a lateral enlarged terminal 28 which is adapted to bear when in one position in a hollow or recess 30 in the bottom of the intermediate rim member 13. The sockets of the members 21—24 are formed diverging at one side or circumferentially of the wheel, as illustrated in Fig. 1, so that the rims 13—16 are permitted a certain degree of play circumferentially of the wheel to prevent cramping of the parts. Springs 31 are arranged between each pair of the interlocking blocks 21—24 and bear against the contiguous faces of the outer rim 13 and the intermediate rim 16 and operate to maintain the rims yieldably in spaced relation.

A plurality of springs 32 are likewise arranged between the contiguous faces of the inner rim 12 and the intermediate rim 16 and operate to maintain the rims yieldably in spaced relation. The various rim members are provided with studs projecting within the springs to prevent lateral displacement. If required, an additional channeled rim member 33 may be employed between the rim 13 and the hub 10 and supplied with springs 34 to maintain them yieldably in separated condition as shown in Figs. 9 and 10, when the improved device is to be employed beneath abnormally heavy trucks or like vehicles.

When the modified structure shown in Figs. 9 and 10 is employed, the members 17—18 will be increased in width as shown. The pins 27 are free to "float" to a limited extent circumferentially of the wheel, by the reversely diverging forms of the sockets, but are held from lateral movement transversely of the wheel.

Having thus described the invention, what is claimed as new is:

1. A wheel including an outer rim carrying a tire, an inner rim spaced from the outer rim and connected by spokes to the hub, an intermediate rim, a plurality of blocks attached to the outer rim, a plurality of blocks attached to the intermediate rim, said blocks having internal sockets diverging in opposite directions and with their confronting ends interlocking, pins engaging the diverging sockets of said blocks, and yieldable means for holding said rim members separated.

2. In a wheel, an outer rim, an inner rim spaced from the outer rim, a plurality of blocks attached to the outer rim, a plurality of blocks attached to the inner rim, said blocks having internal sockets diverging circumferentially of the wheel toward their attaching ends and with their confronting ends interlocking, pins engaging the sockets of said blocks and movable therein circumferentially of the wheel, and yieldable means for holding said rim members separated.

In testimony whereof I affix my signature in presence of two witnesses.

PETER A. ANGESKI. [L. S.]

Witnesses:
EMIL KRESS,
JOHN ANGESKI.

Copies of this patent may be obtained for five cents each, by addressing the "Commissioner of Patents, Washington, D. C."